(12) United States Patent
Ortiz et al.

(10) Patent No.: US 8,043,149 B2
(45) Date of Patent: Oct. 25, 2011

(54) IN-GAME SHOT AIMING INDICATOR

(75) Inventors: David Ortiz, Foster City, CA (US);
Michael Romero, Foster City, CA (US)

(73) Assignee: Sony Computer Entertainment America LLC, Foster City, CA (US)

( * ) Notice: Subject to any disclaimer, the term of this patent is extended or adjusted under 35 U.S.C. 154(b) by 574 days.

(21) Appl. No.: 11/072,148

(22) Filed: Mar. 3, 2005

(65) Prior Publication Data

US 2006/0199626 A1      Sep. 7, 2006

(51) Int. Cl.
*A63F 9/02*      (2006.01)

(52) U.S. Cl. .......................... 463/2; 463/3; 463/4; 463/5

(58) Field of Classification Search .................. 463/2–5, 463/49–57; 273/378, 367, 108.1, 317, 348; 434/19
See application file for complete search history.

(56) References Cited

U.S. PATENT DOCUMENTS

| | | | | |
|---|---|---|---|---|
| 3,762,708 A | * | 10/1973 | Hing | 273/331 |
| 3,815,913 A | | 6/1974 | Wren et al. | |
| 3,856,298 A | * | 12/1974 | Frantti | 473/446 |
| 4,099,719 A | | 7/1978 | Dean et al. | |
| 4,995,607 A | * | 2/1991 | Whitfield | 473/454 |
| 5,181,725 A | * | 1/1993 | Leras et al. | 473/446 |
| 5,401,016 A | * | 3/1995 | Heglund et al. | 473/476 |
| 5,601,487 A | * | 2/1997 | Oshima et al. | 463/4 |
| 5,816,953 A | * | 10/1998 | Cleveland | 473/459 |
| 6,024,643 A | * | 2/2000 | Begis | 463/42 |
| 6,257,983 B1 | * | 7/2001 | Rimoto | 463/38 |
| 6,280,323 B1 | * | 8/2001 | Yamazaki et al. | 463/4 |
| 6,394,894 B1 | * | 5/2002 | Okitsu et al. | 463/3 |
| 6,494,783 B2 | * | 12/2002 | Namba et al. | 463/3 |
| 6,572,476 B2 | * | 6/2003 | Shoji et al. | 463/33 |
| 6,620,042 B1 | * | 9/2003 | Nagata | 463/5 |
| 6,632,137 B1 | * | 10/2003 | Nagata | 463/5 |
| 6,688,974 B2 | * | 2/2004 | Fujioka et al. | 463/2 |
| 6,869,363 B2 | * | 3/2005 | Okitsu et al. | 463/29 |
| 7,063,616 B2 | * | 6/2006 | Kuri | 463/4 |
| 2001/0044334 A1 | * | 11/2001 | Kuri | 463/4 |

(Continued)

OTHER PUBLICATIONS

Satterfield, Shane, World Series Baseball 2k2 Review. GameSpot. Aug. 15, 2001.<http://www.gamespot.com/dreamcast/sports/worldseriesbaseball2k2/review.html?page=3>.*

*Primary Examiner* — Melba Bumgarner
*Assistant Examiner* — Seng H Lim
(74) *Attorney, Agent, or Firm* — Kilpatrick Townsend & Stockton LLP

(57) ABSTRACT

A visual aim indicator shows players the position of a selected one of a set of aim points during a video game. Each of the set of aim points has a predetermined position. The predetermined positions are within a target region, so that the visual aim indicator shows players the likely destination of their aim. Each aim point is associated with a range of control input values, so that players do not need to provide a precise control input value and can quickly select one of the set of aim points. The sizes of the ranges of control input values associated with the aim points can vary so that a player's aim inputs can be biased towards or away from specific aim points. The visual aim indicator is displayed intermittently during an aiming mode of operation and removed from view when the player completes the aiming mode of operation.

8 Claims, 5 Drawing Sheets

U.S. PATENT DOCUMENTS

| | | | |
|---|---|---|---|
| 2002/0016194 A1* | 2/2002 | Namba et al. | 463/3 |
| 2002/0103031 A1* | 8/2002 | Neveu et al. | 463/49 |
| 2003/0141661 A1* | 7/2003 | MacEachern | 273/244 |
| 2004/0058730 A1* | 3/2004 | Ouchi | 463/38 |
| 2005/0026703 A1* | 2/2005 | Fukawa | 463/51 |
| 2005/0101415 A1* | 5/2005 | Sweeney | 473/407 |
| 2005/0186999 A1* | 8/2005 | Melgosa et al. | 463/2 |
| 2005/0187023 A1* | 8/2005 | Miyamoto et al. | 463/43 |
| 2006/0105835 A1* | 5/2006 | Callahan | 463/25 |
| 2006/0128468 A1* | 6/2006 | Yoshikawa et al. | 463/36 |
| 2006/0205463 A1* | 9/2006 | Imaeda et al. | 463/2 |

* cited by examiner

IN-GAME SHOT AIMING INDICATOR

BACKGROUND OF THE INVENTION

The invention relates to the field of video games, and specifically to methods and systems for displaying control input. Many video games feature one or more characters directed by at least one player. A player provides control input through a control device, such as a joystick, to direct the activities of characters. Depending upon the type of game and the context in which control inputs are received, character responses may or may not be immediately visible to a player.

For example, in a hockey video game, the player may provide control input via a joystick to direct the motion of one or more characters. Typically, a player's control input in this context is immediately visible, as the video game moves the character as directed by the control input. Additionally, the player can provide a control input, such as a pressing a button, to direct the character to shoot the puck towards an opponent's goal. To provide additional interactivity and challenge to the video game, many hockey video games allow the player to aim or direct the puck towards a specific region of the goal. In typical prior video game control schemes, this is accomplished by moving the joystick in a direction of a region of the goal at the same time or shortly after providing shot control input. For example, moving the joystick to an "up" position during a shot control input will direct the character to aim the puck towards the top region of the goal, while moving the joystick to a "lower-right" position will direct the character to aim the puck towards the bottom right region of the goal.

In prior video games, the results of this aiming command are not visible to the player until after the shot has been taken. To receive confirmation of his or her aiming command, the player must observe the position of the object, such as a puck, when it arrives at its destination, for example the goal. Because players cannot see the intended destination of their shot until after the shot has been completed, the level and quality of interactivity of the video game is decreased. The lack of visual aim indicators makes it difficult for beginning players to acquire the fundamental skills of the game. For more advanced players, the lack of visual feedback during the aiming process makes it difficult to quickly and precisely perform the full range of available shots in the video game, which unnecessarily limits players' strategies and slows the pace of gameplay.

It is therefore desirable for a system and method to provide players with a visual indication of an object's intended destination during the aiming process to enhance the interactivity of video games. It is further desirable for the visual indication to be intuitive to understand and to avoid unnecessarily complicating the game. It is also desirable for the system and method to be easily implemented in a variety of different types of games and to provide players with additional options for customizing games to their tastes.

BRIEF SUMMARY OF THE INVENTION

An embodiment of the invention includes a visual aim indicator adapted to show players the position of a selected one of a set of aim points during a game. Each of the set of aim points has a predetermined position. The predetermined positions are within a target region, so that the visual aim indicator shows players the destination of their intended aim. Each aim point is associated with a range of control input values, so that players do not need to provide a precise control input value and can quickly select one of the set of aim points. The sizes of the ranges of control input values associated with the aim points can vary so that a player's aim inputs can be biased towards or away from specific aim points. The visual aim indicator is displayed intermittently during an aiming mode of operation and removed from view when the player completes the aiming mode of operation. The set of predetermined positions associated with the set of aim points may be within a target region.

In an embodiment, a method of providing a visual aim indicator in a video game includes receiving a first set of at least one control input from a player, analyzing the first set of at least one control input to determine an aim input value, selecting one of a set of aim points from the aim input value, and displaying a visual aim indicator at the position associated with the selected aim point. Each of the set of aim points has a predetermined position.

In a further embodiment, the method includes receiving a second set of at least one control input from the player, analyzing the second set of at least one control input to determine that an aiming operation is complete, and removing the visual aim indicator in response to the completion of the aim operation.

In still another embodiment, selecting one of the set of aim points includes comparing the aim input value with at least one range of input values associated with each of the set of aim points, and selecting one of the set of aim points associated with the range of input values including the aim input value. In an additional embodiment, the range of input values associated with a first one of the set of aim points is smaller than the range of input values associated with a second one of the set of aim points, thereby biasing the first set of at least one control input towards the second one of the set of aim points.

In an embodiment, the first set of at least one control input includes a first control input requesting the initiation of an aiming operation. In a further embodiment, the first set of at least one control input may include a second control input specifying the aim input value. In another embodiment, the first control input may further specify the aim input value. In stil another embodiment, the video game includes a first mode of operation in which the player controls the aiming operation and a second mode of operation in which the player controls the movement of a game character.

In another embodiment, the set of aim points and the associated set of predetermined positions may be specified by a default set of values included in the video game, by the player, and/or at least in part by an attribute of a game character.

BRIEF DESCRIPTION OF THE DRAWINGS

The invention will be described with reference to the drawings, in which.

DETAILED DESCRIPTION OF THE INVENTION

Figure 1:
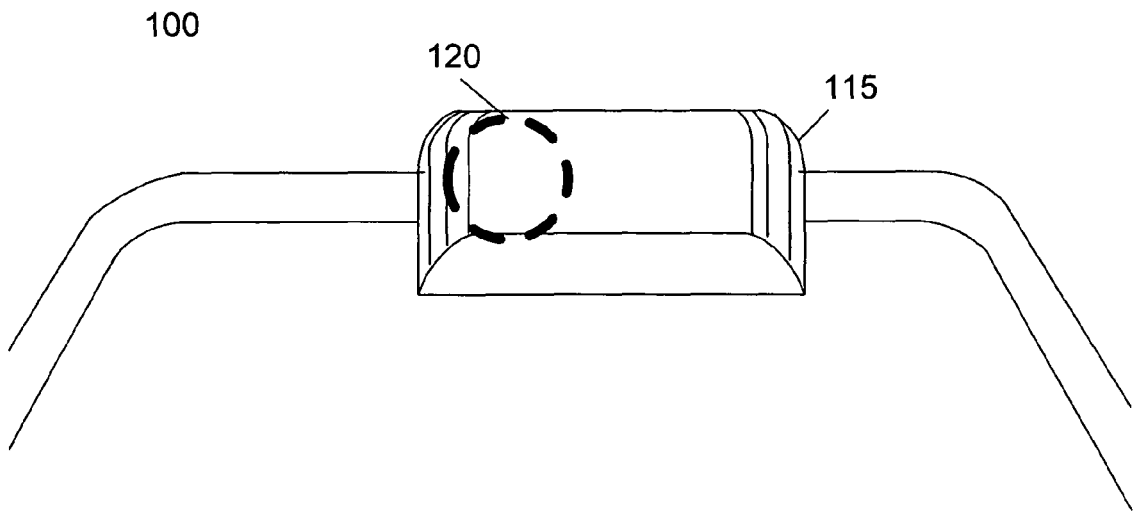
FIG. 1 is an example screen display illustrating an in-game shot aiming indicator according to an embodiment of the invention.
Figure 1:
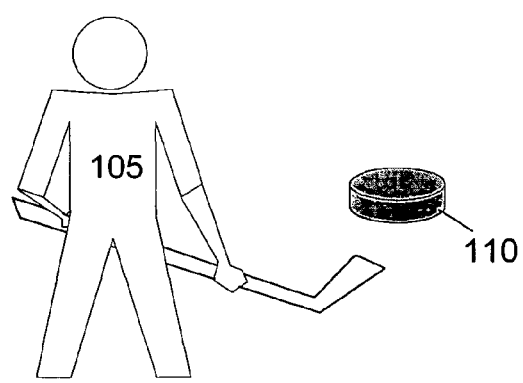

FIG. 1 is an example screen display 100 of an example video game illustrating an in-game shot aiming indicator according to an embodiment of the invention. Screen display 100 includes a game character 105 controlled by a player. One goal of an embodiment video game is for the game character 105 to manipulate shot object 110 towards a target region 115. In one example, game character 105 represents a hockey player in a hockey video game, the shot object 110 represents a hockey puck, and the target region 115 is an opposing team's goal.

In an embodiment, the player manipulates the game character 105 and the shot object 110 using a game controller, which may include analog and/or digital joysticks and control buttons. Continuing with the above example, a player moves the hockey game character within the hockey rink using a joystick input and uses one or more control buttons to direct the game character 105 to shoot the shot object (i.e. the hockey puck) towards the target region 115 (i.e. the opposing team's goal). In one typical control scheme, pressing a control button on a game controller initiates a shot operation. When the control button is released, the game character 105 launches the shot object 110 towards the target region 115. Typically, the duration that the control button is pressed and/or the timing of its release determines the power or force imparted to the shot object 110.

To provide additional interactivity and challenge to the video game, many video games allow the player to aim or direct the shot object 110 towards a specific portion of the target region 115. For example, in real life, hockey players often shoot the puck towards the edges of the goal, so as to have a better chance of getting past the goalie. Similarly, many video games emulate this behavior by enabling a player to direct the shot object 110 towards a specific portion of the target region 115. In typical prior video game control schemes, this is accomplished by moving the joystick in a direction of a portion of the target region 115 at the same time or shortly after pressing the control button associated with the shot operation. For example, moving the joystick to an "up" position during a shot control input will direct the game character 105 to aim the shot object 110 towards the top portion of the target region 115, while moving the joystick to a "lower-right" position will direct the game character 105 to aim the shot object 110 towards the bottom right portion of the target region. Further, while the player holds down the control button associated with the shot operation, changes in the direction of the joystick will change where the shot object 110 is directed within the target region accordingly.

It should be noted that the portion of the target region 115 selected by the player may be only the intended destination of the shot object and the actual destination of the shot object may be determined by any number of different features within the video game, such as the actions of other human or computer-controlled characters, simulation parameters defining the trajectory of the shot object 110, and statistical models of the character's 105 abilities.

In an embodiment of the invention, a visual aim indicator 120 is provided to show players the portion of the target region 115 where the shot object 110 is being aimed. While the player adjusts the character's aim, for example by moving a joystick, the visual aim indicator 120 is changed and/or repositioned to reflect the changing aim points. In an embodiment, the visual aim indicator 120 is positioned on the target region 115. For example, in a hockey video game, the visual aim indicator 120 may be positioned in the front plane of the goal. In a further embodiment, the visual aim indicator 120 can be displayed only as needed, and removed from the screen display 100 at other times. Continuing with the above example, the visual aim indicator 120 can be displayed in a hockey video game when the player initiates a shot by pressing a control button. The visual aim indicator 120 is repositioned within the goal in accordance with the player's joystick inputs, and removed when the control button is released and the shot object is launched towards the target region 115.

In a further embodiment, visual effects known to those of skill in the art, such as lighting, transparency, and animation effects, can be applied to the visual aim indicator 120 to ensure that this indicator is readily visible to the player. Additionally, the presence of visual aim indicator 120 on screen display 100 can alter the appearance of other objects on screen display 100; for example, making some objects partially transparent to prevent the occlusion of visual aim indicator 120. In still a further embodiment, a player may be competing against an opponent using a different screen, for example during play over a local- or wide-area network. In this embodiment, the visual aim indicator 120 can be displayed or hidden on the opponent's screen display.

Although screen display 100 illustrates an example hockey video game, the visual aim indicator 120 can be applied to any type of game genres. For example, a visual aim indicator 120 can be similarly employed in soccer video games to enable players to visualize aiming shots on the goal. The visual aim indicator 120 can also be used in tennis video games to enable players to visualize the intended destination of their shots. In this example, the visual aim indicator can be displayed as a projected on to the surface of an opponent's side of the tennis court or in the plane of the tennis net. Although these examples have referred to the video games representing various real-life sports, embodiments of the invention are equally applicable to video games representing any type of activity, whether reality-based or fictional.

Figure 2:
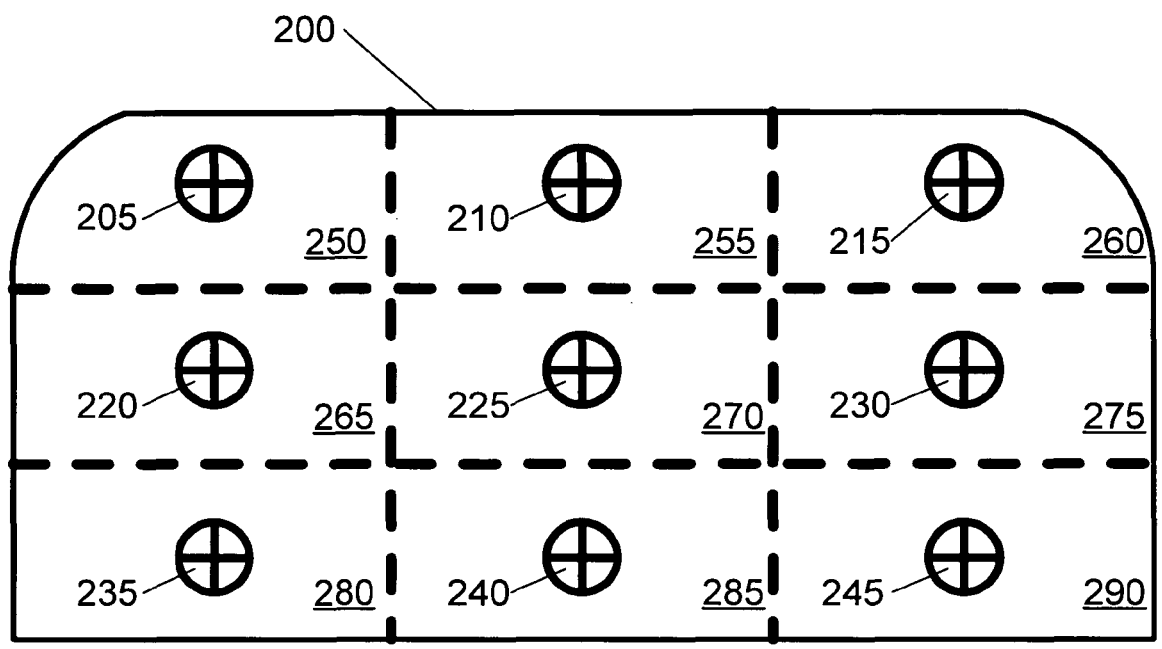
FIG. 2 illustrates an example target region with a predefined set of aim points according to an embodiment of the invention.

During many types of video games, players desire to complete the aiming of the shot object 110 relatively quickly to prevent their opponents from anticipating and blocking the shot object 110 from reaching its intended destination. In a typical implementation using a joystick providing an analog value, the control input can assume a relatively large number of different values, corresponding to a large number of different positions within the target region. This large number of available aiming position forces the player to slow down to precisely select the desired shot object destination. To assist in the rapid aiming of the shot object 110, an embodiment of the invention partitions the target region into a predefined set of aim points. FIG. 2 illustrates an example target region 200 with a predefined set of aim points according to an embodiment of the invention.

Target region 200 is partitioned into aim points 205, 210, 215, 220, 225, 230, 235, 240, and 245. Each aim point corresponds to a different portion of target region 200. For example, aim point 205 corresponds with portion 250 of target region 200. Similarly, aim points 210, 215, 220, 225, 230, 235, 240, and 245 correspond with portions 255, 260, 265, 270, 275, 280, 285, and 290. As discussed in detail below, each aim point is further associated with a position within the target region. For example, aim point 205 is located in the top left corner of the target region, at the approximate center of portion 210. Depending upon the size and visual characteristics of the visual aim indicator, the position associated with each aim point can vary.

During the aiming process discussed above, a player's control inputs are mapped to the set of aim points. In an embodiment, each aim point is associated with one or more ranges of control input values. As a result, the large number of different positions provided by an analog joystick control input are mapped to the much smaller predetermined set of aim points. In the case where the control input has multiple control axes, such as an analog joystick with two control axes, vertical and horizontal, an embodiment of each aim point can be associated with a corresponding number of ranges of control input values.

For example, a range of control values, such as that representing the positions of an analog joystick from its center position to 30% of its full displacement from the center position, can all be associated with the aim point 225, corresponding to the center portion 270 of the target region.

In further embodiments, each range of control values associated with an aim point can correspond directly to an axis of a control input or alternatively can correspond with a transformation of one or more axes of a control input. For example, control values from an analog joystick specifying a position as a pair of control values in a Cartesian coordinate system can be transformed to control values in a polar coordinate system prior to mapping to an aim point.

Because many different control values are associated with each aim point, the player does not need to provide a precise control input value to aim the shot object. As a result, the player is able to aim the shot object quickly. The number of aim points and the sizes and positions of their corresponding portions of the target region can be varied according to player preferences, game character attributes, and the type of game. For example, a player may choose to customize the configuration of the game by specifying a set of aim points and corresponding portions of the target region tailored to his or her playing style.

Similarly, the set of aim points and corresponding target region can be tailored to the attributes of the game character. For example, left-handed game characters may be biased towards aiming the shot object at the right side of the target region. To reflect this, the number of aim points and/or the sizes of the corresponding portions of the target region can be increased relative to those on the left side of the target region. If there are multiple game characters being controlled by a player, each game character can have its own set of aim points.

Additionally, the number of aim points and the sizes and positions of their corresponding portions of the target region can be tailored to the type of video game. For example, a soccer video game typically has a goal that is relatively wide compared to a hockey goal. Therefore, an embodiment of the invention can have a greater number of aim points in the horizontal direction. In another example, a tennis game may have a fewer number of aim points corresponding to the quadrants of the opponent's side of the tennis court. A game can include default values for the number of aim points and the sizes and positions of their corresponding portions.

Figure 3:
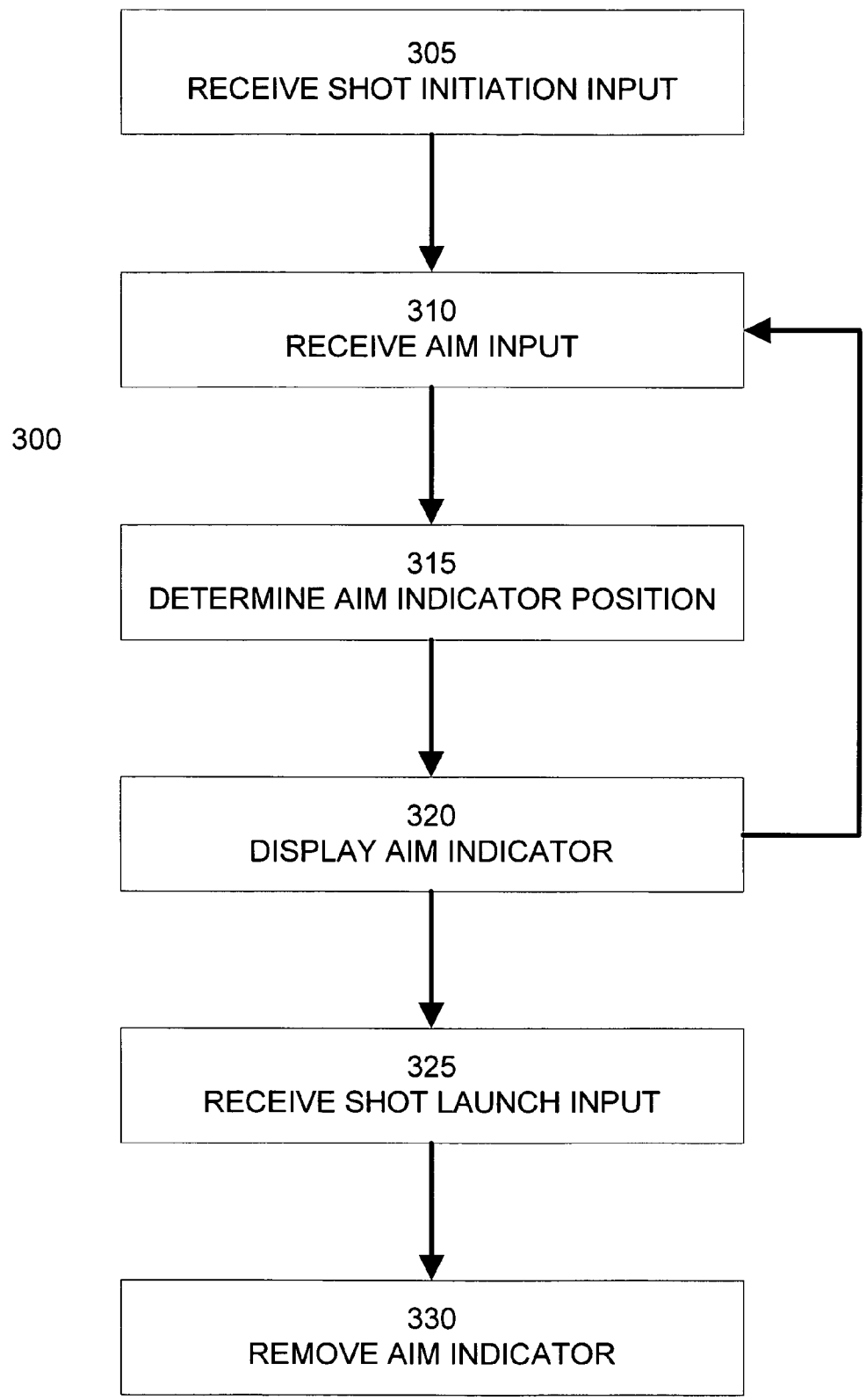
FIG. 3 illustrates a method of operation of an in-game shot aiming indicator according to an embodiment of the invention.

FIG. 3 illustrates a method 300 of operation of an in-game shot aiming indicator according to an embodiment of the invention. Step 305 receives a shot initiation input from a player. In an embodiment, the shot initiation input is the initial pressing of a control button associated with a shot operation on a game controller. Step 310 receives an aim input from a player. In an embodiment, the aim input is a directional input provided via a joystick. In a further embodiment, this directional input can be used to direct the motion of a character prior to the receipt of a shot initiation input in step 305 and to specify the intended destination, or aim, of a shot object following step 305. In alternate embodiment, a separate analog or digital joystick can specify the aim input. In still further embodiments, touch-sensitive pads, one or more control buttons, trigger switches, video cameras, motion sensors, or other input mechanisms known in the art provide the aim input. In another embodiment, steps 305 and 310 can be combined, with the aim input also serving as the shot initiation input.

Step 315 determines the position of a visual aim indicator. In an embodiment, step 315 first maps the aim input to one of a predetermined set of aim points. As discussed above, each aim point can be associated with one or more ranges of control values. By identifying which aim point has ranges of control values including the aim input, an aim point can be selected. In an embodiment, each aim point is further associated with a position within the target region. In this embodiment, the position of the aim point within the target region is used as the visual aim indicator position. In an additional embodiment, the position of the aim point for the purposes of specifying the intended destination of a shot object may differ from the position of the visual aim indicator due to its visual characteristics. For example each aim point can be associated with two different positions, one specifying the intended destination of the shot object and another specifying a corresponding position for the visual aim indicator when this aim point is selected.

Step 320 displays the visual aim indicator at the specified position. Step 320 can employ any technique well known in the art of computer graphics to generate and display the visual aim indicator. The screen display including the visual aim indicator can incorporate 2-D or 3-D computer graphics techniques. Furthermore, the position of the visual aim indicator may undergo one or more coordinate system transformations as it is processed for display. As a player changes the aim input value, for example by moving a joystick, steps 310, 315, and 320 are repeated as needed to update the position of the visual aim point.

Step 325 receives a shot launch input from the player. The shot launch input 325 indicates that the player is finished aiming and in an embodiment that the character should launch the shot object towards the most-recently selected aim point. In one implementation, as discussed above, the shot launch input can be the release of a control button associated with the shot operation. In alternate embodiment, a separate analog or digital joystick, touch-sensitive pads, one or more control buttons, trigger switches, video cameras, motion sensors, or other input mechanisms known in the art provide the shot launch input.

Following step 325, an embodiment of method 300 removes the visual aim indicator from the screen display in step 330. In an alternate embodiment, step 330 is omitted and the visual aim indicator is always displayed, regardless of whether the player is currently aiming a shot. Following method 300, the video game determines an actual destination of the shot using any number of different features within the video game, for example including the player specified aim point and other input parameters, the character's position, the positions and actions of other human or computer-controlled characters, simulation parameters defining the trajectory of the shot object, and statistical models of the character's abilities.

As discussed above, each aim point can be associated with a range of control input values. In a further embodiment, the mapping of control input values to aim points is biased to reflect typical actions of players and/or characters. For example, in real life, hockey players often shoot the puck towards the edges of the goal, so as to have a better chance of getting past the goalie. In accordance with this example, an embodiment of the invention biases the range of control inputs associated with a set of aim points to follow this tendency.

Figure 4:
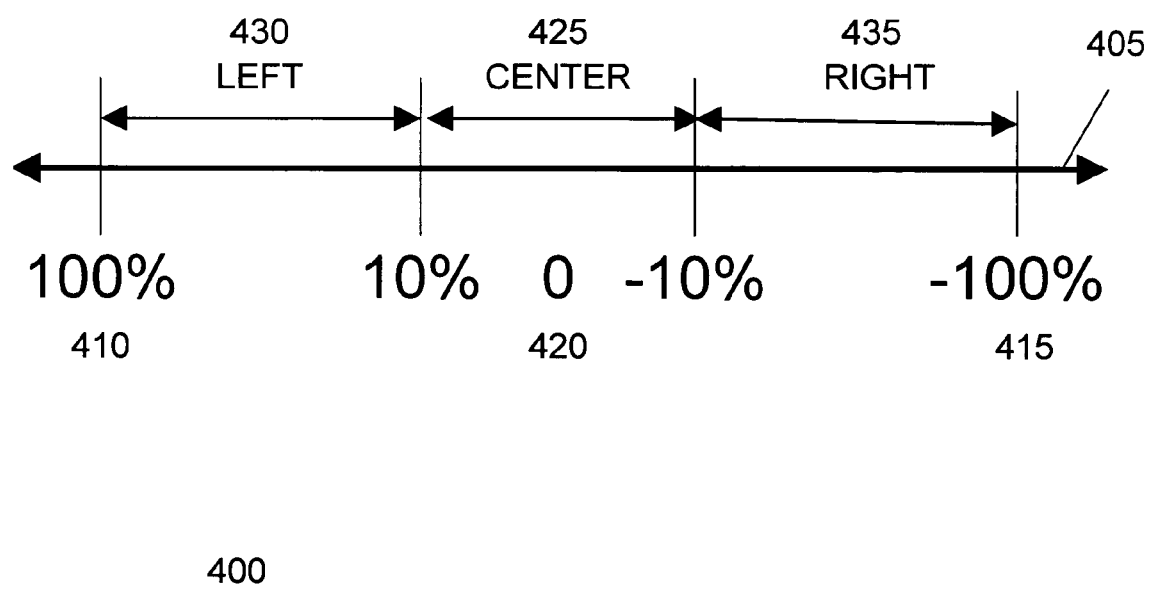
FIG. 4 illustrates an example mapping of a directional control input axis to a set of predefined aim points according to an embodiment of the invention.

FIG. 4 illustrates an example mapping 400 of a directional control input axis to a set of predefined aim points according to an embodiment of the invention. Example mapping 400 shows a control axis 405 illustrating the range of displacement values for a control input, such as an axis of a joystick. For example, axis 405 includes a left-most position 410, corresponding with the fill left displacement of the joystick from its center position, a right-most position 415, corresponding with the fill right displacement of the joystick from its center position, and center position 420, corresponding with the center position of the joystick. The joystick provides a range of control values from position 410 to position 415.

In this embodiment, the range of control values associated with an aim point at a center portion of the target region is smaller than the ranges of control values associated with adjacent aim points at the left and right sides of the target region. For example, the center portion of the target region is associated with the range 425, which is associated with control values within 10% displacement of the center position of the joystick. The left portion of the target region is associated with the range 430, which is associated with the control values between 10% and 100% of the displacement from the center position of the joystick. Similarly, the right portion of the target region is associated with the range 435, which is associated with the control values between −10% and −100% of the displacement from the center position of the joystick. Thus, in this embodiment, a relatively small displacement from the center position of the joystick (e.g. greater than 10%) will result in the selection of an aim point at the side of the target region, rather than the center. A similar control mapping can be applied for selecting aim points in the vertical direction. In an alternate embodiment, the biasing can be reversed, so that control inputs favor the center portion of the target region. Moreover, unequal biasing can be applied so that the control inputs favor one side over another.

Figure 5:
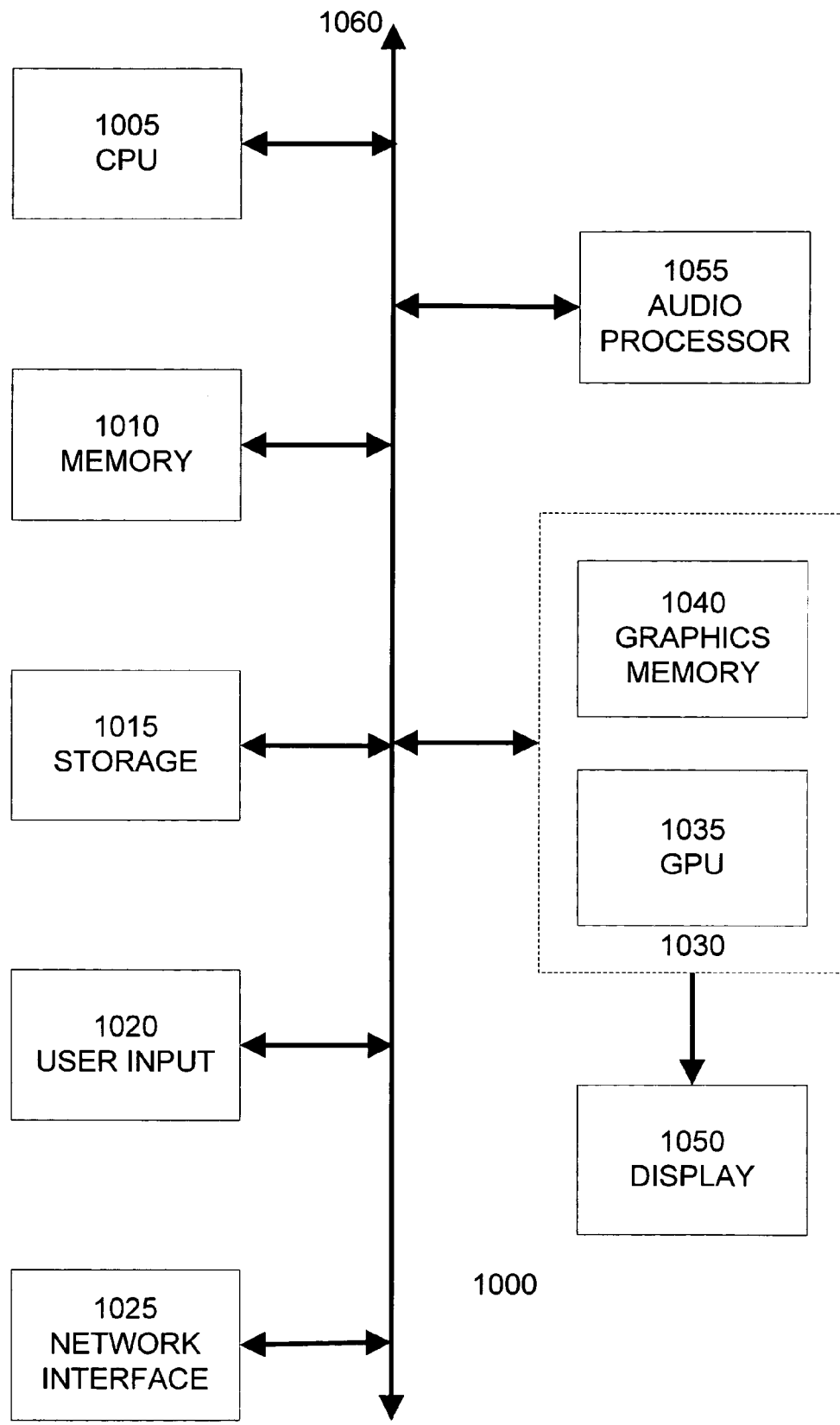
FIG. 5 illustrates an example computer system suitable for implementing an embodiment of the invention.

FIG. 5 is a block diagram of a computer system 1000, such as a personal computer, video game console, personal digital assistant, or other digital device, suitable for practicing an embodiment of the invention. Computer system 1000 includes a central processing unit (CPU) 1005 for running software applications and optionally an operating system. CPU 1005 may be comprised of one or more processing cores. Memory 1010 stores applications and data for use by the CPU 1005. Storage 1015 provides non-volatile storage for applications and data and may include fixed disk drives, removable disk drives, flash memory devices, and CD-ROM, DVD-ROM, Blu-ray, HD-DVD, or other optical storage devices. User input devices 1020 communicate user inputs from one or more users to the computer system 1000, examples of which may include keyboards, mice, joysticks, touch pads, touch screens, still or video cameras, and/or microphones. Network interface 1025 allows computer system 1000 to communicate with other computer systems via an electronic communications network, and may include wired or wireless communication over local area networks and wide area networks such as the Internet. An audio processor 1055 is adapted to generate analog or digital audio output from instructions and/or data provided by the CPU 1005, memory 1010, and/or storage 1015. The components of computer system 1000, including CPU 1005, memory 1010, data storage 1015, user input devices 1020, network interface 1025, and audio processor 1055 are connected via one or more data buses 1060.

A graphics subsystem 1030 is further connected with data bus 1060 and the components of the computer system 1000. The graphics subsystem 1030 includes a graphics processing unit (GPU) 1035 and graphics memory 1040. Graphics memory 1040 includes a display memory (e.g., a frame buffer) used for storing pixel data for each pixel of an output image. Graphics memory 1040 can be integrated in the same device as GPU 1035, connected as a separate device with GPU 1035, and/or implemented within memory 1010. Pixel data can be provided to graphics memory 1040 directly from the CPU 1005. Alternatively, CPU 1005 provides the GPU 1035 with data and/or instructions defining the desired output images, from which the GPU 1035 generates the pixel data of one or more output images. The data and/or instructions defining the desired output images is stored in memory 1010 and/or graphics memory 1040. In an embodiment, the GPU 1035 includes 3D rendering capabilities for generating pixel data for output images from instructions and data defining the geometry, lighting, shading, texturing, motion, and/or camera parameters for a scene. The graphics subsystem 1030 periodically outputs pixel data for an image from graphics memory 1040 to be displayed on display device 1050. Display device 1050 is any device capable of displaying visual information in response to a signal from the computer system 1000, including CRT, LCD, plasma, and OLED displays. Computer system 1000 can provide the display device 1050 with an analog or digital signal.

Further embodiments can be envisioned to one of ordinary skill in the art from the specification and figures. As discussed above, embodiments of the invention can be applied to any type or genre of video games. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of providing a visual aim indicator in a video game, the method comprising:

partitioning a target region into a plurality of partitions, each partition corresponding to a single, predefined aim point, each partition mapped to a respective distinct range of aim input values, wherein the distinct range of aim input values are from a game controller, wherein an area of each partition in the target region is enabled to be customized by the player such that the partitions of the target region are tailored to a playing style of the player, wherein a distinct range of aim input values for a first partition is larger than a distinct range of aim input values for a second partition, thereby biasing aim input values of the entire target region toward the first partition and respective aim point;

receiving a control input from a player;

analyzing the control input to determine an aim input value;

determining one of the partitions mapped to a distinct range of aim input values in which the aim input value falls, and determining the single predefined aim point corresponding to the determined partition; and displaying a visual aim indicator at a position associated with the single, predefined aim point.

2. The method of claim 1, wherein a configuration of the aim points and the corresponding partitions are specified by the player.

3. The method of claim 1, wherein a configuration of the aim points and the corresponding partitions are specified at least in part by an attribute of a game character.

4. The method of claim 1, wherein the aim point in the mapped partition is associated with at least two different positions, one position at an intended destination of a shot object and another position at the position at which the visual aim indicator is displayed.

5. The method of claim 1, wherein the target region is partitioned into nine or less partitions such that the player does not need to provide precise control to select a desired aim point.

6. A method of providing a visual aim indicator in a video game, the method comprising:
- receiving a control input from a player, wherein the control input from the player is through a game controller;
- analyzing the control input to determine an aim input value in each of multiple control axes;
- determining a range from a plurality of ranges in each of the control axes in which each aim input value resides, each of the plurality of ranges in each of the control axes corresponding to a respective visible partition of a target region, each partition having a single, predefined aim point, wherein an area of each partition in the target region is enabled to be customized by the player such that the partitions of the target region are tailored to a playing style of the player, wherein at least one of the plurality of ranges in each of the control axes is larger than another of the ranges in each of the control axes, thereby biasing aim input values of the control axes toward the first partition and respective aim point;
- using the determined range in each of the control axes to map the aim input values in the multiple control axes to a partition; and
- displaying a visual aim indicator at a position associated with the predefined aim point in the mapped partition.

7. The method of claim 6, wherein receiving the control input comprises receiving at least one control value in a first coordinate system and wherein analyzing the control input to determine the aim input value comprises transforming the control input to a second coordinate system.

8. A method of providing a visual aim indicator in a video game, the method comprising:
- an area of a partition in a target region is enabled to be customized by a player such that the partitions of the target region are tailored to a playing style of the player;
- receiving a number from the player;
- partitioning the target region into a number of partitions, the number of partitions of the target region equal to the received number, each partition corresponding to a single, predefined aim point and being mapped to a distinct range of aim input values, wherein the distinct range of aim input values are from a game controller;
- receiving a control input from a player;
- analyzing the control input to determine an aim input value;
- determining one of the partitions mapped to a distinct range of aim input values in which the aim input value falls, and determining the single predefined aim point corresponding to the determined partition; and displaying a visual aim indicator at a position associated with the single, predefined aim point.

* * * * *